United States Patent [19]

Kawabata et al.

[11] Patent Number: 4,512,153
[45] Date of Patent: Apr. 23, 1985

[54] TURBOCHARGER CONTROL SYSTEM

[75] Inventors: Yasuhiro Kawabata, Anjo; Motonobu Akagi, Kariya, both of Japan

[73] Assignee: Aisin Seiki Kabushiki Kaisha, Kariya, Japan

[21] Appl. No.: 454,170

[22] Filed: Dec. 28, 1982

[30] Foreign Application Priority Data

Dec. 31, 1981 [JP] Japan ................................ 56-213058

[51] Int. Cl.³ ............................................ F02B 37/12
[52] U.S. Cl. ..................................................... 60/611
[58] Field of Search ......................... 60/600, 601, 611; 123/555, 564

[56] References Cited

U.S. PATENT DOCUMENTS 3,049,865 8/1962 Drayer ................................... 60/611

FOREIGN PATENT DOCUMENTS 2441804 3/1976 Fed. Rep. of Germany ........ 60/611
137323 11/1978 Japan ...................................... 60/611
52621 3/1982 Japan ...................................... 60/611

Primary Examiner—Michael Koczo
Attorney, Agent, or Firm—Oblon, Fisher, Spivak, McClelland & Maier

[57] ABSTRACT

A turbocharger control system for a vehicle engine which includes a first air passage for supplying air to the vehicle engine, a throttle valve pivotally mounted in the first air passage, a turbocharger having a compressor and a turbine, the compressor being positioned within the first air passage upstream of the throttle valve, a second air passage for connecting a portion of the first passage downstream of the compressor and a portion of the first passage upstream of the compressor, a valve device positioned within the second air passage for relieving fluid pressure from the downstream portion of the first air passage to the upstream of the first air passage, a throttle sensor operatively associated with the throttle valve for detecting the operating position of the throttle valve and generating signals in response thereto and a computer connected to the valve for receiving the signals generated from the throttle sensor and for delivering the signals to the valve to operate the valve in response to the position of the throttle valve and acceleration of movement of the throttle valve.

5 Claims, 4 Drawing Figures

TURBOCHARGER CONTROL SYSTEM

BACKGROUND OF THE INVENTION

1. Field of the Invention

This invention relates to turbocharger control systems and more particularly to turbocharger control systems for controlling the operations of a turbocharger arranged in association with an automobile vehicle engine.

2. Description of the Prior Art

In FIG. 1 showing a conventional turbocharger control system, air which is communicated to a compressor 4 by means of an air passage 3 having an air cleaner 1 and an air flow meter 2 is compressed by a compressor 4, and is then supplied to surge tank 7 by means of passage 5 in response to the degree of opening of a throttle valve 6. After pulsations of compressed air are absorbed, the air is transmitted by means of passage 8 to combustion chamber 10 of the vehicle engine in response to opening movement of suction valve 9. The air within the chamber 10 is mixed with sprayed fuel, and the air-fuel mixture is ignited and combustion occurs in cooperation with compression operation of piston 11.

Exhaust combustion gases are transmitted to passage 13 by opening movement of exhaust valve 12 to thereby cause turbine 14 to rotate. This force of rotation causes the compressor 4 to rotate by means of shaft 15 of turbocharger T. The exhaust gases are then exhaused by means of passage 16. Passages 17, 18 and 19 are arranged between the passages 3 and 5 and relief valve device 20 is positioned therein. The valve device 20 includes housing 21, valve member 22, diaphragm 23 and spring 24, the valve member 22 being biased in its closed position by means of spring 24.

In such conventional system, when the driver suddenly releases the accelerator pedal driving under a high load or high speed conditions of the vehicle, throttle valve 6 is suddenly closed and therefore fluid pressure within passage 5 will be suddenly increased. The diaphragm 23 which continuously receives fluid pressure within passage 5 by means of passage 18 is now urged so as to be moved upwardly and valve member 22 is then urged to an open position against the biasing force of the spring 24. Accordingly, fluid pressure within passage 5 will be relieved by means of passages 19 and 17 to thereby reduce fluid pressure within passage 5 whereby damage to throttle valve 6 and the pipe defining passage 5 will be prevented. In such a conventional system, however, valve device 20 begins to operate only after fluid pressure within passage 5 exceeds a predetermined value. In other words, the valve device 20 is operated regardless of the speed of closing movement of throttle valve 6. Therefore, the responsiveness of operation of the valve device will be lessened.

SUMMARY OF THE INVENTION

Therefore, it is an object of the present invention to provide a new and improved turbocharger control system which obviates the above-mentioned prior drawbacks.

It is another object of the present invention to provide a new and improved turbocharger control system which is high in response to operation thereof. In accordance with the present invention, a turbocharger control system is provided which includes first air passage means for supplying air to said vehicle, a throttle valve pivotally mounted in said first air passage means, a turbocharger having a compressor and a turbine, said compressor being positioned within said first air passage means upstream of said throttle valve, second air passage means for connecting a portion of said first passage means downstream of said compressor and a portion of said first passage means upstream of said compressor, valve means positioned within said second air passage means for relieving fluid pressure from said downstream portion of said first air passage means to said upstream portion of said upstream air passage means, throttle sensor means operatively associated with said throttle valve for detecting the position of said throttle valve and generating signals in response thereto, a computer connected to said valve means for receiving said signals generated from said throttle sensor means and for delivering said signals to said valve means for operating said valve means in response to the position of said throttle valve and acceleration of movement of said throttle valve.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENT

Figure 1:
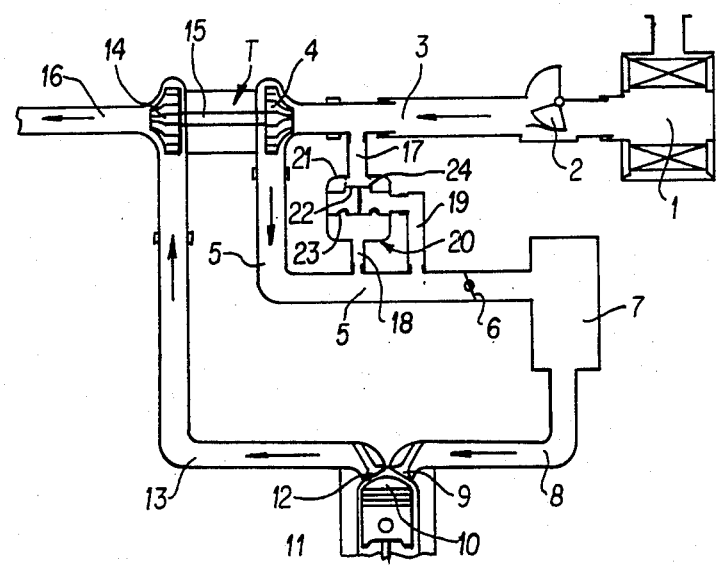
FIG. 1 is a view showing the details of a conventional turbocharger control system.
Figure 2:
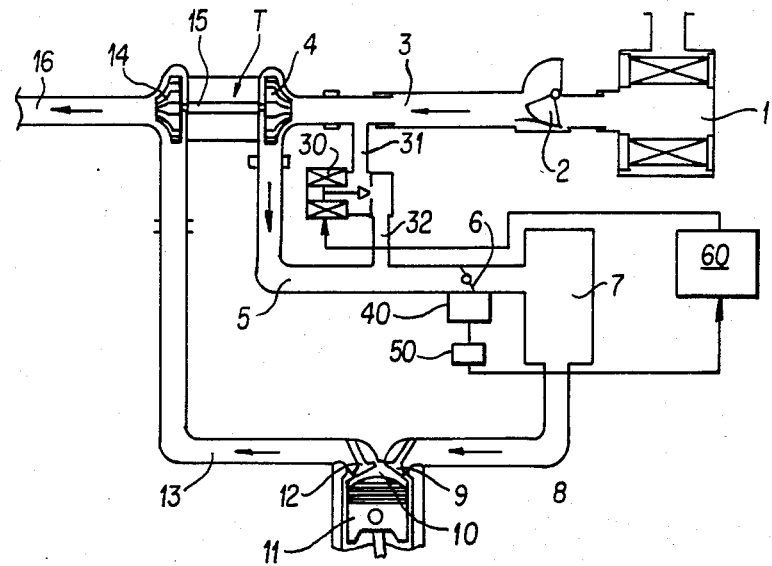
FIG. 2 is a view similar to FIG. 1, but showing a turbocharger control system according to the present invention.
Figure 3:
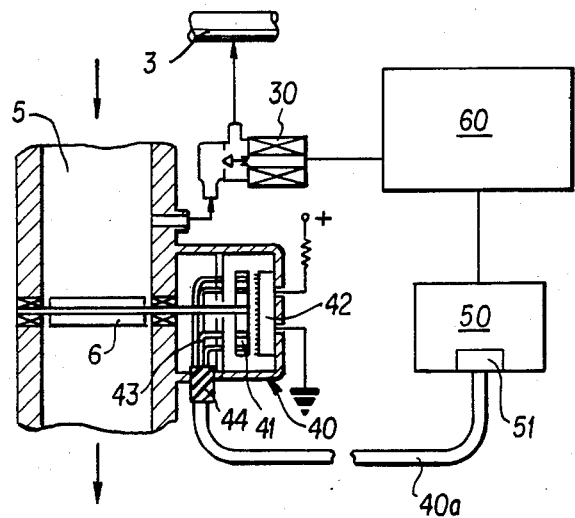
FIG. 3 is an enlarged detailed view of a part of FIG. 2.

In FIGS. 2 and 3 showing a turbocharger control system, a valve device 30 is positioned between passages 31 and 32 which are open to passages 3 and 5 respectively. Conventional solenoid valve devices may be used for valve device 30. A throttle sensor 40 is also provided which is positioned close to the throttle valve 6 and connected to a photoelectric converter 50 by means of cable 40a of optical fiber.

The throttle sensor 40 serves to detect the operational position of the throttle valve 6. The throttle sensor 40 comprises a perforated disc 41 which is secured to an extending end portion of pivoting shaft 6a of the throttle valve 6 and has plurality of small holes formed therein and a luminescent diode 42 as an LED group 43 which is positioned so as to oppose the perforated disc 41. Therefore, patterns of light which correspond to the operational position of the throttle valve 6 is sent from the diode 42 to the cable 40a of optical fiber by means of the perforated disc 41. Numeral 44 denotes a bushing made of rubber material for installation.

The photoelectric converter 50 functions to convert light signals transmitted from the throttle sensor 40 to a photo diode 51 into electric signals. The photoelectric converter 50 is electrically connected to a computer 60 which is, in turn, connected to the valve device 30.

In operation, upon sudden deceleration of the vehicle from high load or high speed conditions of the vehicle, the throttle valve 6 is suddenly closed so that fluid pressure within passage 5 is suddenly increased. The closed position of the throttle valve 6 can be judged from patterns of lights which pass through the perforated disc 41. These patterns or signals of light will be converted into electric signals by means of the photoelectric converter 50 and will then be transmitted to the computer 60.

Figure 4:
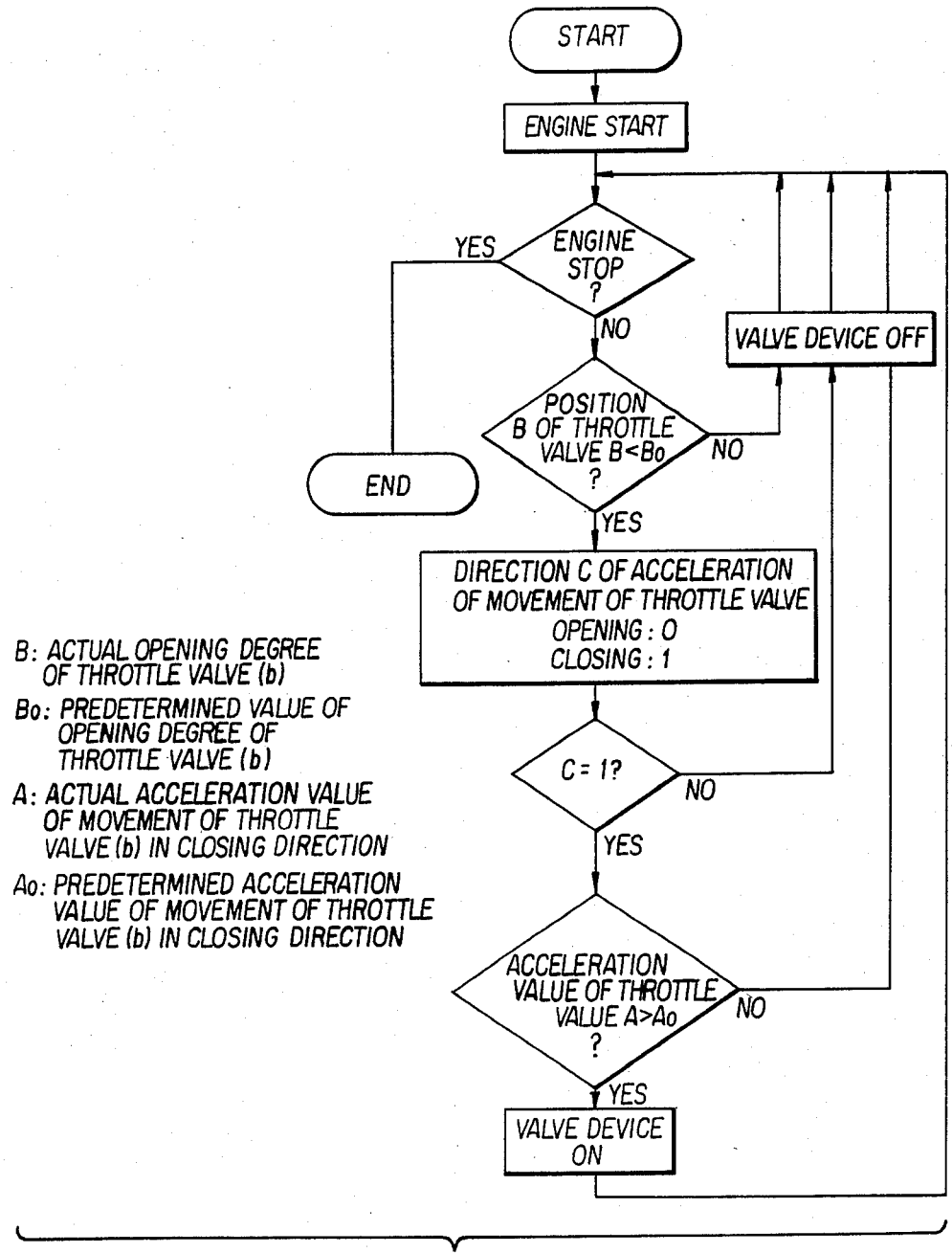
FIG. 4 illustrates the manner of operation of the present invention.

The computer 60 has a plurality of timers disposed therein to thereby regularly introduce the above-noted electric signals and the acceleration of the movement of the throttle valve 6 may thus be calculated in a conventional manner. Thus, the computer 60 delivers electric signals to thereby cause the valve device 30 to operate in response to the position of the throttle valve 6 and acceleration of movement of the throttle valve 6. The valve device 30 operates to relieve fluid pressure within passage 5 in response to the above-noted electric signals from the computer 60 as per the illustration shown in FIG. 4. The valve device 30 may be constructed such that the rate of on-off time of a valve portion of the valve device 30 will be controlled or the degree of opening of valve portion of the valve device 30 will be controlled.

In case the throttle valve 6 is gradually closed, fluid pressure within passage 5 will not be increased as it causes the valve device 30 to operate. In other words, the valve device 30 may be operated only when the throttle valve 6 is closed at a speed which is higher than the predetermined speed and the degree of closing thereof will exceed a predetermined value.

While a preferred embodiment of the invention has been described, it will readily apparent to those skilled in the art that various changes and arrangements can be made to accomplish the objects of the invention without departing from the scope and spirit of the appended claims.

What is claimed as new and is intended to be secured by Letters Patent is:

1. A turbocharger control system for a vehicle engine, comprising:
    first air passage means for supplying air to said vehicle;
    a throttle valve pivotally mounted in said first air passage means;
    a turbocharger having a compressor and a turbine, said compressor being positioned within said first air passage means upstream of said throttle valve;
    second air passage means for connecting a portion of said first passage means downstream of said compressor and a portion of said first air passage means upstream of said compressor;
    valve means positioned within said second air passage means for relieving fluid pressure from said downstream portion of said first air passage means to said upstream portion of said first air passage means;
    throttle sensor means operatively associated with said throttle valve for detecting the position of said throttle valve and generating first signals in response thereto; and
    a computer connected to said valve means for receiving said first signals generated from said throttle sensor means, for calculating acceleration of movement of said throttle valve from said first signals and for delivering second signals to said valve means for operating said valve means in response to the position of said throttle valve and acceleration of movement of said throttle valve.

2. A turbocharger control system as set forth in claim 1, wherein said throttle sensor means further comprises a perforated disc connected to said throttle valve, a luminescent diode positioned so as to be opposed to said disc for generating light signals, a photoelectric converter for converting said light signals into electric signals indicative of the position of said throttle valve and which is electrically connected to said computer and an optical fiber cable, one end portion of said cable being connected to said photoelectric converter and an opposite end portion being located adjacent said disc for receiving said light signals emitted by said luminescent diode and passing said light signals through said perforated disc.

3. A turbocharger control system as set forth in claim 2, further comprising an LED group diode positioned at one end of said optical fibre cable for receiving said patterns of light emitted by said luminescent diode.

4. A turbocharger control system as set forth in claim 2, wherein said perforated disc is connected to an extended end portion of a pivoting shaft portion of said throttle valve.

5. A turbocharger control system as set forth in claim 1, wherein said second signals are generated only when said throttle valve is closed at a speed which is higher than a predetermined speed and the degree of closing thereof exceeds a predetermined value.

* * * * *